United States Patent Office 3,107,258
Patented Oct. 15, 1963

3,107,258
PROCESS FOR THE PREPARATION OF AMIDES
Vincent Lamberti, Teaneck, and Gerard J. McCrimlisk, Saddle Brook, N.J., assignors to Lever Brothers Company, New York, N.Y., a corporation of Maine
No Drawing. Filed May 2, 1961, Ser. No. 107,028
9 Claims. (Cl. 260—404)

This invention relates to a method of making amides and more particularly to an improved process for the preparation of amides from fatty acid esters and secondary alkylolamines.

Fatty acid dihydroxyalkyl amides are becoming increasingly important as additives in liquid detergent compositions. In the reaction between the lower alkanol esters of higher fatty acids and a dihydroxyalkyl amine to form the fatty acid dihydroxyalkyl amides, there is a tendency toward the formation of an ester-amide by virtue of the following equilibrium:

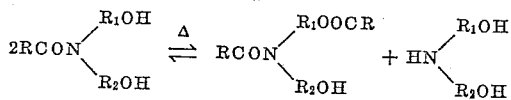

This equilibrium is such as to favor the formation of substantial quantities of the ester-amide particularly at elevated temperatures. Since the presence of this compound is deleterious to the foaming properties of detergent compositions containing the dihydroxyalkyl amide, there have been attempts to prepare the amide under conditions such as to suppress the formation of the undesirable ester-amide.

For example, the condensation has been carried out at relatively low temperatures where the formation of the undesirable compound proceeds at a negligible rate. This reaction takes place under vacuum conditions to distill the volatile alcohol formed during the reaction and thus minimize exothermic heat of reaction. Since the rate of reaction leading to the formation of dihydroxyalkyl amides is higher at elevated temperatures, the effect of carrying out the condensation at low temperatures is to lengthen the reaction time and in some cases decrease the yield of the desirable amides.

Another method used to produce the dihydroxyalkyl amide essentially free of ester-amide is to hold the final reaction mixture containing the amide and substantial amounts of the ester-amide for at least two days at temperatures below 55° C. and in the presence of an alkali metal catalyst. During this aging period, the ester-amide product is converted for the most part to the dihydroxyalkyl amide. This time-consuming holding period is a necessary step in the high temperature preparation of a dihydroxyalkyl amide suitable for use in liquid detergent compositions.

Thus, a quick and efficient method for producing dihydroxyalkyl amides free of undesirable by-products has been and still is the objective of many researchers.

An object of this invention is to provide a quick and efficient process for the preparation of fatty acid dihydroxyalkyl amides at relatively high temperatures.

Another object is to provide a process for the production of dihydroxyalkyl amides without the necessity for elaborate and time-consuming holding periods.

These and other objects and advantages of the invention are attained by reacting about 1 mole of a higher fatty acid ester with an excess of a dihydroxy alkylamine at temperatures of about 200°–280° F. and under essentially atmospheric pressure conditions in the presence of relatively high levels of an alkali metal catalyst. The ester is added gradually to the heated mixture of the catalyst and the amine under conditions such that at all times during the reaction there is maintained a relatively large excess of free amine relative to the fatty acid ester and an excess of the alcohol liberated from the fatty acid ester relative to the ester-amide by-product. The net effect of these conditions is a rapid reaction rate with a short contact time for the reactants and with minimum formation of ester-amide.

While not wanting to be limited to any hypothesis, it is postulated that at the high levels of catalyst and alcohol which exist in the present process, there is another equilibrium which operates between the ester-amide, alcohol, amide and fatty acid ester as follows:

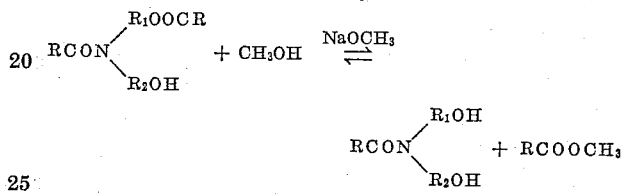

Since the rate of reaction of this equilibrium proceeds at a much faster rate compared to the rate for the equilibrium involving the amide and the ester-amide, the formation of the ester-amide is largely suppressed under the conditions of the present process thereby leading to a product in substantial equilibrium by the end of the short cooling period which follows the reaction.

The esters which are used in the present process are prepared from higher fatty acids and mixtures thereof. The fatty acid radical may generally contain from about 10 to about 18 carbon atoms and may be derived from acids including lauric, myristic, etc., or from naturally occurring triglyceride fats and oils such as coconut oil.

The alcohol moiety of the fatty acid esters is preferably derived from the lower alkanols such as methanol, ethanol, butanol, etc. It is particularly important that the present process be carried out under non-vacuum conditions in order that some of the alcohol liberated from the fatty acid ester be present in the reaction mixture. Thus, when methyl laurate is condensed with diethanolamine, only about 60% of the amount of methanol theoretically produced distills over while the remainder is left in the reaction mixture.

The secondary amine used in preparing the amide is a dihydroxyalkyl amine such as diethanolamine, dipropanolamine, dibutanolamine, etc. These amines have two alkyl radicals each joining a hydroxyl group to the same nitrogen atom which contains a replaceable hydrogen. It is equally important to the successful operation of the present process that the amine be present in excess during the reaction. At least 1.1 moles of amine per mole of fatty acid ester is required for the reaction and it is especially preferred to utilize the ratio of about 1.3 to 1.0.

As an aid in maintaining a relatively large excess of amine, it is essential that the ester reagent be added gradually to the reaction mixture. Upon completing the addition of fatty acid ester, the reaction is about complete when the distillation of the liberated alcohol has essentially ceased. The reaction mixture is thereupon cooled from the reaction temperatures of about 200°–280° F. to storage temperatures (about 120° F.) over a period of approximately three hours. At the completion of this three-hour cooling period, the equilibrium conditions have been achieved and any further holding time is unnecessary for conversion of ester-amide to the amide.

The catalyst used in the process of the invention is preferably sodium methoxide. It is particularly important that the sodium methoxide be present in the reaction in proportions of at least 0.2% by weight, based on the weight of the reactants. Amounts of about 0.76% have been found especially useful in producing amides containing low levels of ester-amides. Other alkali metal catalysts may also be used. These include alkali metals per se, their alkoxides and amides. The catalyst, of course, may be prepared in situ by well-known procedures.

The following example is illustrative of the present invention.

EXAMPLE I

Liquid diethanolamine and a 25% solution of sodium methoxide in methanol were charged to a reaction vessel equipped with mechanical agitation. The sodium methoxide solution was added so that the catalyst was present in an amount of 0.05 mole per mole of ester used. Where the ester is methyl laurate (90% $C_{12}$–10% $C_{14}$), the catalyst is 0.76% by weight of the combined weights of diethanolamine and methyl laurate. The mixture of the catalyst and diethanolamine was then heated to 240° F. with agitation. The methyl laurate was gradually added to the mixture while maintaining the temperature at 240° F. The mole ratio of the amine to ester is 1.3 to 1.0, respectively. During the addition of the methyl ester, about 60% of the amount of methanol theoretically produced in the reaction was condensed and collected. The rest of the methanol remained in the reaction mixture. The addition of the methyl laurate was completed in about 30–33 minutes. After the methanol distillation had essentially ceased, the reaction product was cooled to 120° F. over a three-hour period. The product was thereupon discharged to storage. The overall time cycle for the process on a laboratory scale was about five hours.

The following table shows the results of analyzing several runs of the product at various periods after reaction and during cooling.

*Table I*

| Sample at— | Percent Methyl laurate | Percent Ester-Amide |
|---|---|---|
| 240° F.—before cooling | 2.96 | 9.1 |
| 200° F.—after 1 hour cooling | 2.96 | 3.5 |
| 160° F.—after 2 hours cooling | 2.14 | 2.6 |
| 120° F.—after 3 hours cooling | 2.15 | 0.6 |
| 120° F.—after 20 hours storage at 120° F. | 1.91 | nil |

It can be readily seen that at the termination of the cooling period, the percentage of ester-amide is reduced to a bare minimum and further holding to allow conversion from the ester-amide to the amide is of little use.

Table II shows the effect on the level of esters in the product of varying the reactant ratio and catalyst concentration.

*Table II*

| Run No. | Mole Ratio of Diethanolamine per Mole of Methyl Laurate-Myristate [1] | Weight percent Sodium Methoxide Basis Weight of Reactants | Percent Total Esters [2] |
|---|---|---|---|
| 1 | 1.3 | 0.05 | 31 |
| 2 | 1.3 | 0.38 | 6.5 |
| 3 | 1.3 | 0.76 | 5.5 |
| 4 | 1.3 | 1.14 | 5.0 |
| 5 | 1.1 | 0.05 | 41 |
| 6 | 1.1 | 0.76 | 7.0 |
| 7 | [3] 1.3 | 0.76 | 3.0 |

[1] 80% methyl laurate—20% methyl myristate.
[2] Includes both methyl ester and amide ester—all calculated as amide ester.
[3] Whole coconut methyl esters used in this run.

It will occur to those skilled in the art that there are many modifications to the invention as specifically described herein. It is intended to include all such modifications within the scope of the appended claims.

We claim:
1. A method for the production of fatty acid dihydroxyalkyl amides which comprises gradually adding an ester of a higher fatty acid to a secondary dihydroxyalkyl amine at temperatures of about 200° F. to 280° F. and under non-vacuum conditions in the presence of a relatively high level of an alkali metal catalyst selected from the group consisting of alkali metals, alkali metal alkoxides and alkali metal amides, the total mole proportions of amine to ester being at least 1.1 to 1.0 respectively, the reaction conditions being maintained so that at all times there exists an excess of amine relative to the fatty acid ester and an excess of liberated alcohol relative to the ester-amide by-product, and thereafter slowly cooling the reaction mixture until a product is obtained which is free of substantial amounts of ester-amide by-product.

2. A process according to claim 1 in which the ester is methyl laurate.

3. The process according to claim 1 in which the ester is a mixture of methyl laurate and methyl myristate.

4. The process of claim 1 in which the ester is the methyl esters of coconut oil fatty acids.

5. The process of claim 1 in which the catalyst is sodium methoxide.

6. A method for the production of fatty acid dihydroxyalkyl amides which comprises gradually adding about 1.0 moles of methyl laurate to about 1.3 moles of diethanolamine at a temperature of about 240° F. and under essentially atmospheric pressure in the presence of about 0.76% sodium methoxide based on the weight of amine and ester, and upon completion of the reaction, cooling the product to about 120° F. within approximately a three-hour period to obtain the lauric diethanolamide essentially free of interfering by-products.

7. The process of claim 6 wherein the methyl laurate contains methyl myristate.

8. The process of claim 6 wherein the methyl laurate contains methyl esters of fatty acids derived from coconut oil.

9. The process of claim 6 wherein the mole ratio of amine to ester is about 1.1 to 1.0, respectively.

References Cited in the file of this patent

UNITED STATES PATENTS

| 2,464,094 | Meade | Mar. 8, 1949 |
| 2,877,246 | Schurman | Mar. 10, 1959 |